OR 3,512,871

SEARCH ROOM

May 19, 1970 H. J. ZWEIG 3,512,871

LIGHT BEAM DEFLECTION USING FOURIER OPTICS

Filed June 22, 1965 2 Sheets-Sheet 1

INVENTOR.
HANS J. ZWEIG
BY Elmer Galli
ATTORNEY

LIGHT BEAM DEFLECTION USING FOURIER OPTICS

Filed June 22, 1965 2 Sheets-Sheet 2

United States Patent Office 3,512,871
Patented May 19, 1970

3,512,871

LIGHT BEAM DEFLECTION USING FOURIER OPTICS

Hans J. Zweig, Saratoga, Calif., assignor to International Business Machines Corporation, Armonk, N.Y., a corporation of New York Filed June 22, 1965, Ser. No. 465,941
Int. Cl. G02f 1/32
U.S. Cl. 350—161 8 Claims

ABSTRACT OF THE DISCLOSURE

An optical system utilizing two cross-variable frequency periodical structures to deflect a light beam which is used to read data. The system includes a light source which generates a beam of light which is passed through two ultrasonic delay lines. The ultrasonic waves are generated in the delay lines and the delay lines are oriented so that the ultrasonic waves in one delay line are at right angles to the ultrasonic waves in the other delay line. The diffraction effects in the ultrasonic delay lines break the initial beam down into four diffracted beams. These can then be used to read out four identical memory planes. By appropriately choosing the frequencies, the spurious signals due to higher order diffraction effects can be eliminated.

This invention relates to optical systems and more particularly to a system for deflecting or indexing light.

In many applications where light is used, it is necessary to selectively deflect or index the light. There are several known techniques for deflecing or indexing light beams. One known technique involves using movable mirrors which are positioned so that the light is directed to the appropriate location. This type of system has the severe disadvantage that moving a mechanical element is a relatively slow operation compared to the speed of modern day electronic equipment. Another known technique involves using a flying spot scanner. In a flying spot scanner an electronic beam is deflected and then the appropriately deflected electrons are used to generate light in a desired location. One disadvantage of a flying spot scanner is that the output light has a relatively low intensity.

An object of the present invention is to provide an improved light deflecting mechanism.

Yet another object of the present invention is to provide a high speed light deflecting mechanism.

A still further object of the present invention is to provide a high speed light deflecting mechanism.

Yet another object of the present invention is to provide a device that can selectively position a light beam in two dimensions at electronic speeds.

The above objects and advantages are achieved by using a system that includes a monochromatic light source and two cells wherein compression waves are generated in a transparent medium. The compression waves affect the index of refraction of the transparent medium and, hence, light passing through the transparent medium is diffracted. A lens is positioned to focus the light passing through the cells thereby producing a plurality of dots in the Fraunhofer plane of the lens. By appropriately choosing the direction and amplitude of the compression waves, most of the light can be directed into selected points in the Fraunhofer plane of the lens. The locations of these selected points can be moved or indexed by varying the frequency of the compression waves. By using various special techniques such as nonsinusoidal compression waves or specially arranged mirrors, a substantial portion of the light can be directed into one particular indexable point in the Fraunhofer plane of the lens.

One important application of light deflecting devices is the storage and retrieval of data that is stored in the form of opaque and transparent areas on a memory plane.

A light deflecting system according to the present invention is particularly suited for this application. Since the illuminated points produced by the various orders of diffraction in a system built in accordance with the present invention move synchronously, these illuminated points can simultaneously read a plurality of bits that form one data word.

Therefore, still another object of the present invention is to provide an optical system for reading and writing data.

The foregoing and other objects, features and advantages of the invention will be apparent from the following more particular description of preferred embodiments of the invention, as illustrated in the accompanying drawings.

Figure 1:
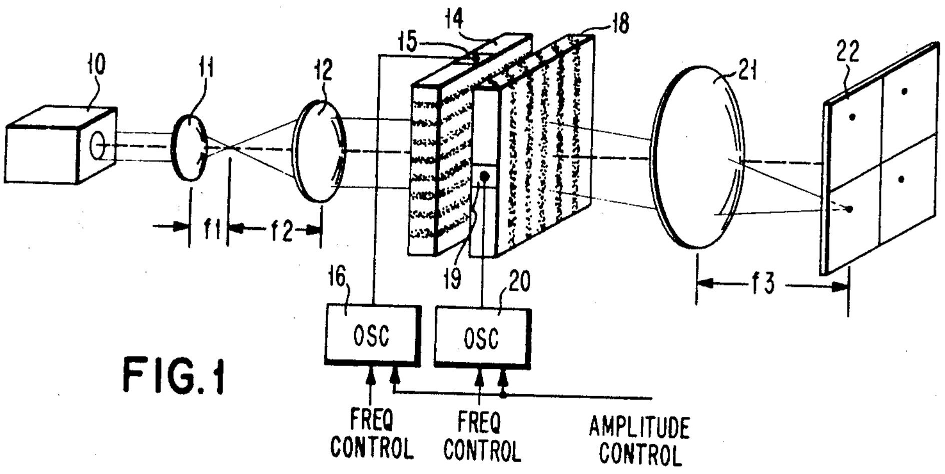
FIG. 1 shows an overall view of the first embodiment of the present invention.

The first preferred embodiment of the invention shown in FIG. 1 includes a laser 10, a first lens system that includes two lenses 11 and 12, a first diffracting cell 14 that includes a driver 15 and associated drive circuitry 16, a second diffracting cell 18 that includes a driver 19 and associated drive circuitry 20, a focusing lens 21, and an output screen 22. The effect produced by diffracting cells 14 and 18 is similar to the effect produced by two crossed diffraction gratings. Drivers 15 and 19 create compression waves in cells 14 and 18. The compression waves affect the index of refraction of the material in cells 14 and 18 thereby affecting the light passing through the cells in the same manner as does a phase diffraction grating. Due to the location of drivers 15 and 19, the waves in cell 18 are orthogonal to the waves in cell 14. The amplitude and frequency of the waves in the cells 14 and 18 is variable and it is controlled by variable frequency oscillator circuits 16 and 20. Cells 14 and 18 could, for example, consist of commercially available quartz ultrasonic delay lines with piezoelectric drivers or they could consist of water filled delay lines with piezoelectric drivers. Circuits 16 and 20 are variable frequency oscillators.

The distance between lenses 11 and 12 is equal to the sum of the focal length of lens 11 (designated *f1*) plus focal length of lens 12 (designated *f2*). The distance from lens 21 to screen 22 is equal to the focal length of lens 21 (designated *f3*). The distance between the other elements should be made as small as possible to prevent vignetting. The elements are shown as separated in the drawing for convenience and clarity of illustration.

In general, the system shown in FIG. 1 operates as follows. Light source 10 generates a collimated light beam. Lenses 11 and 12 increase the size of the collimated beam and they direct the light at cells 14 and 18. Circuits 16 and 20 and drivers 15 and 19 create compression waves in cells 14 and 18 which change the index of refraction of the material in cells 14 and 18 thereby causing cells 14 and 18 to act as crossed diffraction gratings. The diffraction patterns generated by cells 14 and 18 are transformed by lens 21 into an array of dots on screen 22. As will be explained, by appropriately choosing the amplitude and shape of the waves in cells 14 and 18, most of the light energy can be directed into one or more points on screen 22. The position of the point of points receiving most of the light energy can be controlled or varied by varying the frequency of the signals generated by circuits 16 and 20.

The operation of cells 14 and 18 will first be qualitatively described with reference to FIG. 2 to 3D. Later, the operation will be described more quantitatively.

Figure 2:
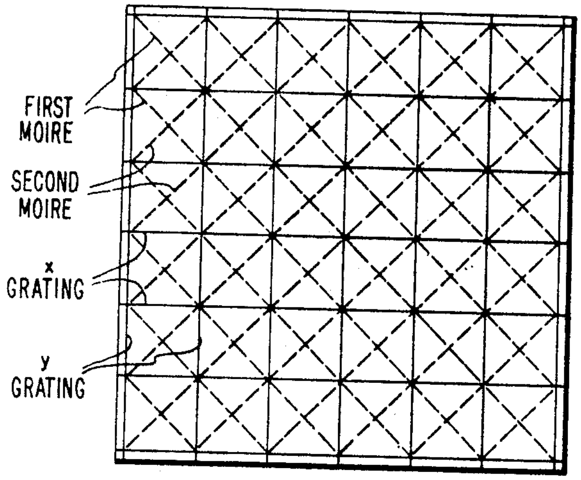
FIG. 2 shows two superimposed diffraction gratings.

FIG. 2 shows two cross diffraction gratings. The lines that form the two gratings are respectively designated the $x$ grating and the $y$ grating. It is known that cross diffraction gratings produce an effect known as the moire effect. As a first order approximation, the moire effect can be described as the same effect as would be produced by two additional diffraction gratings, the lines of which form the diagonals of the rectangles formed by the lines of the crossed gratings. For convenience in explanation, the pseudo grating which will be used to explain moire effect are shown in FIG. 2 by dotted lines and they are respectively designated the first moire grating and the second moire grating. For further convenience in explanation, the four gratings shown in FIG. 2 are individually shown in FIG. gratings shown in FIG. 2 are individually shown in FIGS. 2A to 2D. The light patterns produced in output plane 22 can be considered as the superposition of the diffraction patterns formed by each of the four gratings shown in FIG. 2 individually. FIGS. 3A to 3D show the Fraunhofer pattern due to each of the diffraction gratings individually. FIG. 3A shows that the $x$ grating forms a series of dots along the $y$ axis, FIG. 3B shows that the $y$ grating forms a series of dots along the $x$ axis and FIGS. 3C and 3D show that the moire effect poduces a series of dots along the diagonal lines. FIG. 3 shows the superposition of the four diffraction paterns shown in FIGS. 3A to 3D. Second order effect also produces other illuminated points not described by the above explanation. These will be explained by the later given quantitative explanation.

The manner that the ultrasonic compression waves in cells 14 and 18 modify the phase of the light passing through cells can be described by Equation 1 below which describes the effect of cells 14 and 18 upon a monochromatic plane wave of unit amplitude that is incident normally on cells 14 and 18.

(1) $$\phi(x,y)=A_x \sin v_x x+A_y \sin v_y y$$

where:

$\phi(x,y)$ is the phase of the wave after passing through cells 14 and 18;

$x$ and $y$ are the coordinate values in the plane of the ultrasonic waves in cells 14 and 18;

$A_x$ and $A_y$ are related to the magnitude of the compression waves in cells 14 and 18 (see Equation 5 below), and $v_x$ and $v_y$ are respectively the frequencies of the waves in cells 14 and 18.

In the Fraunhofer plane of lens 21, (i.e., on screen 22) the amplitude distribution of the light is given by Equation 2 below.

(2) $$\mu(\xi,\eta)=\left(\frac{1}{2\pi}\right)^2 \int\int e^{i\phi(x,y)} e^{i(\xi x+\eta y)}dxdy$$

where:

$\epsilon$ and $\eta$ are the coordinates on screen 22, and $\mu(\epsilon,\eta)$ is the amplitude distribution of the light on screen 22.

Equation 2 can be solved by giving Equation 3 below.

(3)
$$\mu(\xi,\eta)=J_o(A_x)J_o(A_y)\delta(\xi,\eta)+J_o(A_x)J_1(A_y)\delta(\xi,\eta\pm v_y)+J_1(A_x)J_o(A_y)\delta(\xi\pm v_x,\eta)+J_1(A_x)J_1(A_y)\delta(\xi\pm v_x,\eta\pm v_y)x$$

where:

$J_o$ and $J$ represent Bessel functions of the first kind, and $\delta$ is the Dirac delta function.

The light is concentrated at the points given by Equation 4 below.

(4) $$(\epsilon=iv_x,\ \eta=jv_y)$$

and the intensity at these points is given by $$|\mu(\xi,\eta)|^2=|\mu(iv_x,jv_y|^2 =J_i^2(A_x)J_j^2(A_y)$$

where:

$i=0, \pm1, \pm2 \ldots$ and it denotes the diffraction order in the $x$ direction;

$j=0, \pm1, \pm2 \ldots$ and it denotes the diffraction order in the $y$ direction.

For simplicity in all following discussions $A_x$ will be made equal to $A_y$. This quantity A is related to the magnitude of the compression waves in cells 14 and 18 by Equation 5 below.

(5) $$A=\frac{\pi}{\lambda}\frac{\epsilon_1}{\sqrt{\epsilon_0}}d$$

where:

$\epsilon_0$ is the dielectric constant of the undisturbed liquid through which the ultrasonic waves travel;

$\epsilon_1$ is the maximum increment in the dielectric constant due to the ultrasonic compression waves (the value of $\epsilon_1$ is controlled by the magnitude of the signals applied to drivers 15 and 19);

$\lambda$ is the wavelength of the light generated by source 10;

$d$ is the direction parallel to the optical axis (i.e. the path length of the light beam during its interaction with the ultrasonic wave).

By appropriately controlling the magnitude of A, it is possible to direct almost all of the light from source 10 to four selected points on screen 22. FIG. 1 shows a common control line for simultaneously controlling the output of oscillator circuits 16 and 20.

The following table gives the value of the various orders of Bessel functions for various values of A.

| A | $J_0$ | $J_1$ | $J_2$ | $J_3$ |
|---|---|---|---|---|
| 1.0 | .765 | .440 | .155 | .005 |
| 1.5 | .512 | .558 | .232 | .061 |
| 2.0 | .224 | .577 | .353 | .129 |
| 2.5 | .002 | .497 | .400 | .143 |
| 3.0 | .260 | .339 | .486 | .309 |

Figure 3:
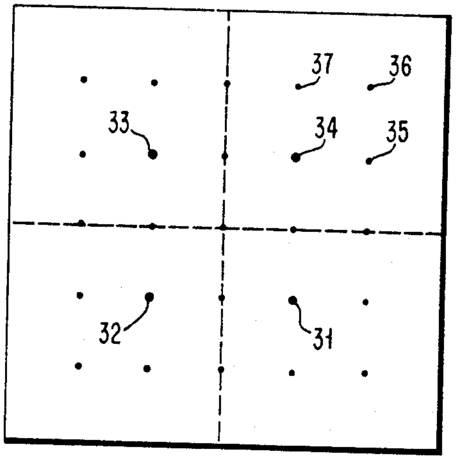
FIG. 3 shows the light pattern generated by the first embodiment of the invention.
Figure 2A:
FIGS. 2A to 2D show four diffraction gratings.
Figure 3A:
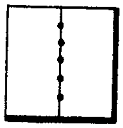
FIGS. 3A to 3D show four diffraction patterns due to the gratings shown in FIGS. 2A to 2D.
Figure 3B:
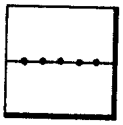
Figure 2C:
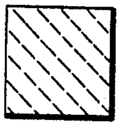
Figure 3C:
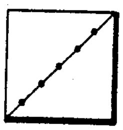
Figure 2D:
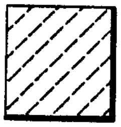
Figure 3D:
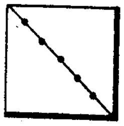

By driving cells 14 and 18 with signals of appropriate magnitude (see Equation 5 above) the value of A can be made equal to 1.5 and almost ten percent of all of the light energy will be included on each of the four first order moire spots (i.e., spots 31 to 34 in FIG. 3).

The angular deflection that can be achieved using the present invention is approximately given by Equation 6 below. Equation 6 defines the angular deflection due to first order diffraction, that is, Equation 6 defines the angular deflection by cells 14 and 18 of the light that reaches spots 31 to 34 in FIG. 3.

(6) $$\alpha=\frac{\lambda}{\Lambda}$$

where:

$\alpha$ is the angular deflection;

$\lambda$ is the wavelength of light emitted by source 10, and $\Lambda$ is the wavelength of the compression waves in cells 14 and 18.

For large changes in the frequency of the waves in cells 14 and 18 (i.e., for large changes in the frequency of the signals generated by circuits 16 and 20), the angular deflection range of the light in higher diffraction orders can overlap the angular deflection range of light in lower orders. However, by limiting the allowable frequency range, each order of diffraction can be confined to an exclusive range of angular deflections and an area on screen 22 can be exclusively assigned to each order of diffraction.

Figure 4:
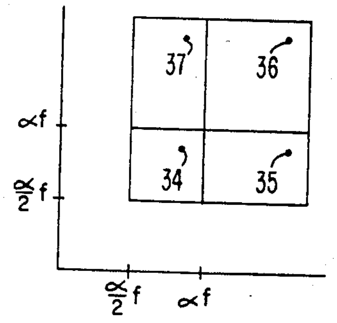
FIG. 4 is a graph used to explain the operation of the invention.
Figure 2B:
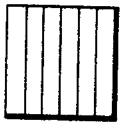

For example, if the frequency range of the signals generated by oscillators 16 and 20 is limited so that the minimum frequency generated is one-half of the maximum frequency, each of the different points that are illuminated in plane 22 due to first and second order diffraction is restricted to a unique area. FIG. 4 shows the areas to which the first and second order points (designated 34, 35, 36 and 37 in FIG. 3) are limited when the signals generated by oscillators 16 and 20 are restricted to frequencies greater than one-half the maximum frequency. For example, as shown in FIG. 4, the point 34 which is generated by the first order moire effect, is restricted to the area bounded by lines that are positioned $\alpha f$ and one-half $\alpha f$ units from the coordinates where $\alpha$ is the maximum possible deflection and $f$ is the focal length of lens 21.

Figure 5:
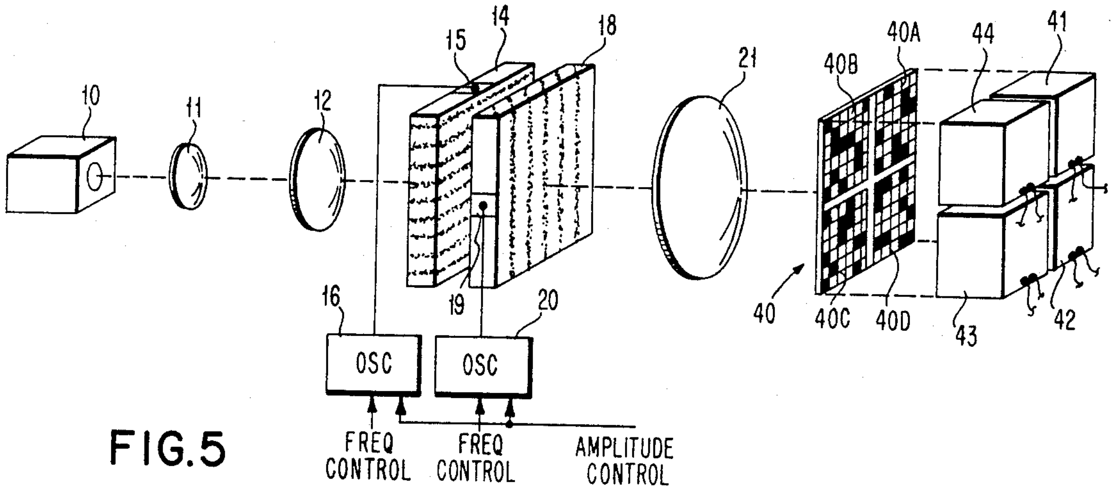
FIG. 5 shows an alternate preferred embodiment of the present invention.

A second preferred embodiment of the present invention is shown in FIG. 5. The embodiment of the invention shown in FIG. 5 is identical to the first embodiment with the exception that screen 22 has been replaced by a memory plane 40 and four photoreceptors 41 to 44 are positioned next to memory plane 40. In FIG. 5 for convenience and clarity of illustration, the photoreceptors 41 to 44 are shown horizontally displaced from memory plane 40. Actually, it is preferable if the photoreceptors 41 to 44 are juxtaposed to memory plane 40.

The memory plane 40 has information stored thereon in the form of transparent and opaque areas. The plane is divided into four sectors that are designated 40A to 40D. As shown in FIG. 5, each sector has thirty-six storage locations. Herein, only thirty-six storage locations are shown in each sector for convenience of illustration. An actual system could include many thousands or millions of bits, as will be explained in detail later. Each of the thirty-six storage locations in each sector is either transparent or opaque. For example, a transparent location can indicate a binary ONE and an opaque location can indicate a binary ZERO. The frequency of oscillators 16 and 20 and the various distances are chosen so that the four sectors 40A to 40D occupy areas that are exclusively associated with the four first order points of light (see FIG. 4).

Memory plane 40 has thirty-six words thereon, each of which has four bits. One bit of each word is stored in each of the four sectors 40A to 40D. The system to the left of memory plane 40 produces four dots of light (as shown in FIG. 1) that simultaneously read out four bits of information, one from each of the memory sectors 40A to 40D. The frequency of the signal generated by oscillator 16 controls the vertical position of the bit being read and the frequency of the signal generated by oscillator 20 controls the horizontal position of the bit being read. When the frequency of either oscillator 16 or oscillator 20 is changed, the location of all four illuminated points move synchronously. By appropriately adjusting the frequency of oscillator 16 and oscillator 20, the position of the light spots can be adjusted so that the four locations corresponding to any particular word in memory plane 40 are illuminated. If any illuminated bit location is transparent, the photoreceptors 41 to 44 associated with the sector wherein the bit is located will generate an output indicating the storage of a binary ZERO.

The number of bits that can be stored in each of the memory sectors 40A to 40D is given by Equation 8 below which indicates that the number of bits is substantially equal to the maximum total deflection divided by the distance from the optical axis to the center of the first order diffraction pattern.

$$N=\frac{\alpha F}{\frac{\lambda}{w}f} \quad (8)$$

where:

N is the number of bits that can be stored in each sector;
$\alpha$ is the maximum amount of deflection possible;
F is the focal length of lens 21;
$\lambda$ is the wavelength generated by source 10, and
$w$ is the width of the collimated beam emitted by lens 12.

As shown in FIG. 5, the system is adapted for reading optical data. Naturally, the system can also be used to store data by providing a medium in plane 40 such as photographic film which has properties that change as a result of illumination.

Figure 6:
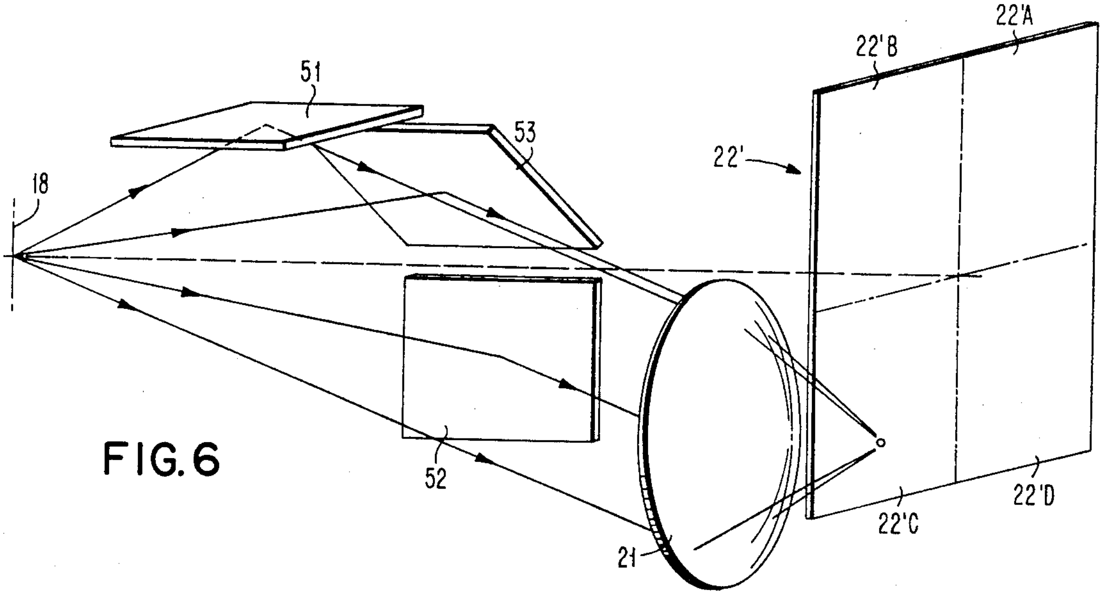
FIG. 6 shows another feature of the present invention.

Another feature of the present invention is shown in FIG. 6. In the previously described embodiments of the invention, at any particular time at least four points are illuminated at any time. In some applications, it is desirable to only illuminate one point and it is further desirable to have a large amount of the light energy directed to this one particular point. FIG. 6 shows an arrangement of mirrors that can be positioned between cell 18 and lens 21 whereby the light from each of the four points 31 to 34 shown in FIG. 3 is directed to one location. The system of mirrors includes a horizontal mirror 51, a vertical mirror 52, and an inclined mirror 53. All three mirrors are positioned between diffraction cell 18 and lens 21. Furthermore, lens 21 is moved off the optical axis. (If desired, one could increase the size of lens 21 and have it centered on the optical axis.) As shown in FIG. 6, the horizontal mirror is positioned above the top of cell 18, the vertical mirror is positioned left of cell 18 and the inclined mirror 53 is inclined between the ends of mirrors 51 and 52. For convenience of reference as shown in FIG. 6, the four quadrants of screen 22 are designated 22A to 22D. Mirror 51 deflects the light which would normally reach quadrant B of screen 22A so that it reaches quadrant 22C, mirror 52 deflects the light that would normally reach quadrant 22D so that it reaches quadrant 22C and mirror 53 deflects the light that would normally reach quadrant 22A so that it reaches quadrant 22C. It is noted that in order to properly focus the light, it is essential that mirrors 51 to 53 be positioned to the left-hand side of lens 21.

Figure 7:
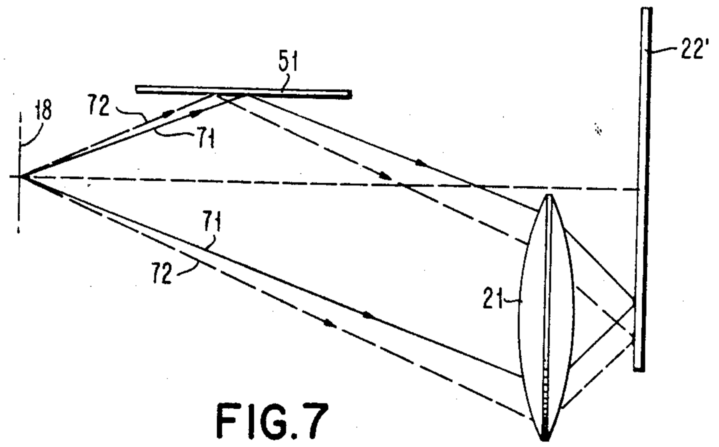
FIG. 7 is a diagram used to explain the operation of the alternate embodiment of the invention.

The operation of the system shown in FIG. 6 is illustrated in FIG. 7 which shows mirror 51, lens 21 and screen 22. Two sets of light rays are shown emanating from cell 18. The two sets of light rays have different angular deflection. The first set of light rays designated 71 has a relatively small angular deflection and the second set of rays designated 72 has a relatively large angular deflection. It is noted that rays 71 would normally be incident on quadrant 22D of screen 22. However, mirror 51 deflects the rays. The point at which the rays intersect mirror 51 changes as the angular deflection changes. However, the rays on the right-hand side of mirror 51 in each set are travelling in a parallel direction; however, the direction of the path of the two sets of rays is not parallel. Lens 21 focuses parallel light to a point. The particular point where the light is focused depends upon the direction at which the parallel rays are incident on the lens. Since, for different angular deflections emanating from cell 18, the direction of the light incident on lens 21 changes, the position that the light is focused on screen 22' also changes.

As previously explained by driving cells 14 and 18, which signals having an amplitude so that the parameter A equals a particular value, ten percent of the light from source 10 can be directed into each of the four first order points. Thus, by using the system shown in FIG. 6, forty percent of the light can be directed into one indexable point.

As shown herein, there are two compression waves travelling in orthogonal directions in 14 and 18. These two waves need not be orthogonal; they merely need travel in angularly displaced directions. Furthermore, both waves could be generated in one cell.

In the previously described embodiments, oscillators 16 and 20 generate sinusoidal output signal whereby the waves in cells 14 and 18 are sinusoidal. Due to the sinusoidal nature of the waves in cells 14 and 18, the light patterns generated on screen 22 are symmetrical relative to each of the coordinate axes. One could obtain an unsymmetrical pattern on screen 22 by using nonsinusoidal waves and cells 14 and 18. For example, if sinusoidal oscillators 16 and 18 are replaced by saw tooth oscillators, practically all of the light could be directed to one quadrant on screen 22.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. A light deflecting system comprising:
a light source;
a first transparent diffraction cell;
means for generating ultrasonic waves in said first diffraction cell;
a second transparent diffraction cell;
means for generating ultrasonic waves in said second diffraction cell, said waves in said second cell being angularly displaced from waves in said first cell;
means for directing the light from said light source through said first and second diffraction cell;
focusing means for focusing the light passing through said diffraction cells; and
a plurality of mirrors positioned between said second diffraction cell and said focusing means to intercept the light passing through said diffraction cells and deflect the light in parallel paths toward said focusing means,
whereby a plurality of illuminated points appear in the Fraunhofer plane of said focusing means, the position of said points being a function of the frequency of said ultrasonic waves, and whereby all of the light going to corresponding points in each quadrant of said plane is directed to a single point.

2. A light deflecting system comprising:
a light source;
a first ultrasonic delay line;
a second ultrasonic delay line angularly displaced from said first ultrasonic delay line;
means for generating ultrasonic compression waves in said delay lines;
means for directing the light from said light source through said ultrasonic delay lines;
means for focusing light passing through said delay lines; and
a plurality of mirrors positioned between said second diffraction cell and said focusing means to intercept the light passing through said diffraction cells and deflect the light in parallel paths toward said focusing means,
whereby a plurality of illuminated points appear in the Fraunhofer plane of said focusing means, the location of said illuminated points being a function of the frequency of said waves in said delay lines, and
whereby all of the light going to corresponding points in each quadrant of said point is directed to a single point.

3. A memory system comprising:
a record element having a plurality of sectors each of said sectors having corresponding information storage locations;
means for simultaneously illuminating corresponding storage locations in each sector comprising:
a light source;
a first transparent diffraction cells;
means for generating ultrasonic waves in said first diffraction cell;
a second transparent diffraction cell;
means for generating ultrasonic waves in said second diffraction cell, said waves in said second diffraction cell being angularly displaced from the waves in said first diffraction cell, the minimum frequency of said waves in said first and second transparent diffraction cell being about one-half of the maximum frequency, the maximum frequency being that frequency which when exceeded causes overlap of the first and second orders of the light diffracted by said diffraction cells, to restrict the first order of diffraction to an exclusive range of angular deflections as a function of frequency variation between the maximum frequency and one-half the maximum frequency;
means for directing the light from said light source through said first and second diffraction cell; and
means for generating ultrasonic waves in said first diffraction cell onto said record element whereby a plurality of points on said record element are illuminated.

4. The light deflecting system of claim 3 wherein the generating means produces ultrasonic waves having a magnitude, A, as defined in the equation:

$$A=\frac{\pi}{\lambda}\frac{\epsilon_1}{\sqrt{\epsilon_0}}d$$

wherein:
$\epsilon_0$ is the dielectric constant of the cell through which the ultrasonic waves travel;
$\epsilon_1$ is the maximum increment in the dielectric constant due to the ultrasonic waves;
$\lambda$ is the wavelength of the light generated by said source; and
$d$ is the direction parallel to the optical axis, of about 1.5, whereby almost ten percent of all of the light energy will be included on each of the four first order moire spots generated by said diffraction cells.

5. A light deflecting system comprising:
a light source;
a first transparent diffraction cell;
means for generating ultrasonic waves in said first diffraction cell;
a second transparent diffraction cell;
means for generating ultrasonic waves in said second cell being angularly displaced from waves in said first cell, the minimum frequency of said waves in said first and second transparent diffraction cells being about one-half of the maximum frequency, the maximum frequency being that frequency which when exceeded causes overlap of the first and second orders of the light diffracted by said diffraction cells, to restrict the first order of diffraction to an exclusive range of angular deflections as a function of frequency variation between the maximum frequency and one-half the maximum frequency;
means for directing the light from said light source through said first and second diffraction cell, and
focusing means for focusing the light passing through said diffraction cells,
whereby a plurality of illuminated points appear in the Fraunhofer plane of said focusing means, the position of said points being a function of the frequency of said ultrasonic waves.

6. The light deflecting system of claim 5 wherein the generating means produces ultrasonic waves having a magnitude, A, as defined in the equation:

$$A=\frac{\pi}{\lambda}\frac{\epsilon_1}{\sqrt{\epsilon_0}}d$$

wherein:

$\epsilon_0$ is the dielectric constant of the cell through which the ultrasonic waves travel;

$\epsilon_1$ is the maximum increment in the dielectric constant due to the ultrasonic waves;

$\lambda$ is the wavelentgh of the light generated by said source; and $d$ is the direction parallel to the optical axis, of about 1.5, whereby almost ten percent of all of the light energy will be included on each of the four first order moire spots generated by said diffraction cells.

7. A light deflecting system comprising:

a light source;

a first ultrasonic delay line;

a second ultrasonic delay line angularly displaced from said first ultrasonic delay line;

means for generating ultrasonic compression waves in said delay lines, the minimum frequency of said waves in the delay lines being about one-half of the maximum frequency, the maximum frequency being that frequency which when exceeded causes overlap of the first and second orders of the light diffracted by said diffraction cells, to restrict the first order of diffraction to an exclusive range of angular deflections as a function of frequency variation between tthe maximum frequency and one-half the maximum frequency;

means for directing the light from said light source through said ultrasonic delay lines; and means for focusing light passing through said delay lines whereby a plurality of illuminated points appear in the Fraunhofer plane of said focusing means, the location of said illuminated points being a function of the frequency of said waves in said delay lines.

8. The light deflecting system of claim 7 wherein the generating means produces ultrasonic waves having a magnitude, A, as defined in the equation:

$$A=\frac{\pi}{\lambda}\frac{\epsilon_1}{\sqrt{\epsilon_0}}d$$

wherein:

$\epsilon_0$ is the dielectric constant of the cell through which the ultrasonic waves travel;

$\epsilon_1$ is the maximum increment in the dielectric constant due to the ultrasonic compression waves;

$\lambda$ is the wavelength of the light generated by said source; and $d$ is the direction parallel to the optical axis, of about 1.5, whereby almost ten percent of all of the light energy will be included on each of the four first order moire spots generated by said diffraction cells.

References Cited

UNITED STATES PATENTS

| | | | |
|---|---|---|---|
| 3,297,876 | 1/1967 | De Maria ---------- | 331—94.5 |
| 3,312,955 | 4/1967 | Lamberts et al. | |

RONALD L. WIBERT, Primary Examiner

W. L. SIKES, Assistant Examiner

U.S. Cl. X.R.

350—162

PO-1050
(5/69)

UNITED STATES PATENT OFFICE
CERTIFICATE OF CORRECTION

Patent No. 3,512,871 Dated May 19, 1970

Inventor(s) Hans J. Zweig

It is certified that error appears in the above-identified patent and that said Letters Patent are hereby corrected as shown below:

In the claims:

Column 7: line 60, "diffraction cell" should read --delay line--; line 61, "diffraction cells" should read --delay lines--; line 70, "point" should read --plane--.

Column 8: line 4, "cells" should read --cell--; line 24, cancel "means for generating ultrasonic waves in" and insert therefor --means for focusing the light passing through--.

Column 9: line 29, "diffraction cells" should read --delay lines--.

Column 10: line 15, "cell" should read --delay line--; line 24, "diffraction cells" should read --delay lines--.

SIGNED AND SEALED
OCT 27 1970

(SEAL)
Attest:

Edward M. Fletcher, Jr.
Attesting Officer

WILLIAM E. SCHUYLER, JR.
Commissioner of Patents